United States Patent
Kim et al.

(10) Patent No.: US 8,441,528 B2
(45) Date of Patent: May 14, 2013

(54) STEREOSCOPIC IMAGE DISPLAY AND DRIVING METHOD THEREOF

(75) Inventors: Seonggyun Kim, Gyeonggi-do (KR); Jeongki Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 517 days.

(21) Appl. No.: 12/631,134

(22) Filed: Dec. 4, 2009

(65) Prior Publication Data
US 2011/0018983 A1    Jan. 27, 2011

(30) Foreign Application Priority Data
Jul. 22, 2009  (KR) .................. 10-2009-0066935

(51) Int. Cl.
*H04N 13/04*    (2006.01)

(52) U.S. Cl.
USPC .............................. 348/56; 348/51; 345/419

(58) Field of Classification Search .......... 348/51, 348/56; 345/102, 419
See application file for complete search history.

(56) References Cited

U.S. PATENT DOCUMENTS

| | | | |
|---|---|---|---|
| 2007/0229395 A1* | 10/2007 | Slavenburg et al. | 345/8 |
| 2007/0229951 A1* | 10/2007 | Jung et al. | 359/465 |
| 2007/0285774 A1* | 12/2007 | Merrirt et al. | 359/465 |
| 2008/0316303 A1* | 12/2008 | Chiu et al. | 348/51 |
| 2009/0146944 A1* | 6/2009 | Kirk | 345/102 |
| 2010/0026794 A1* | 2/2010 | Chang | 348/56 |
| 2010/0208041 A1* | 8/2010 | Savvateev et al. | 348/51 |
| 2010/0238274 A1* | 9/2010 | Kim et al. | 348/51 |
| 2011/0032346 A1* | 2/2011 | Kleinberger | 348/59 |

FOREIGN PATENT DOCUMENTS

| | | |
|---|---|---|
| JP | 2006-157775 A | 6/2006 |
| KR | 10-2008-0017598 | 2/2008 |
| KR | 10-2008-0040900 | 5/2008 |
| KR | 10-2008-0063435 | 7/2008 |
| KR | 10-2008-0094261 | 10/2008 |

OTHER PUBLICATIONS

Chinese Office Action dated Feb. 14, 2012, issued in a corresponding Chinese patent application.

* cited by examiner

*Primary Examiner* — Abdullahi Salad
(74) *Attorney, Agent, or Firm* — Morgan, Lewis & Bockius LLP

(57) ABSTRACT

A stereoscopic image display includes: a display device that time-division displays left-eye image data and right-eye image data; shutter glasses comprising a left-eye shutter and a right-eye shutter alternately turned on and off in synchronization with the display device; and a backlight unit that irradiates light to the display device and is periodically turned on and off such that the backlight unit is turned on when a predetermined time determined according to a response time of liquid crystal lapses from a start point of a frame period.

16 Claims, 13 Drawing Sheets

STEREOSCOPIC IMAGE DISPLAY AND DRIVING METHOD THEREOF

This nonprovisional application claims priority under 35 U.S.C. §119(a) on patent application No. 10-2009-0066935 filed in Republic of Korea on Jul. 22, 2009, the entire contents of which are hereby incorporated by reference.

BACKGROUND

1. Field

This document relates to a stereoscopic (i.e., three-dimensional (3D) image display capable of displaying a stereoscopic image by using a display device that displays left-eye image data and right-eye image data based on time division and active shutter glasses including a left-eye shutter and a right-eye shutter alternately turned on and off so as to be synchronized with left-eye and right-eye data of the display device, and a driving method thereof.

2. Related Art

A stereoscopic (or 3D) image display is divided into a device using a stereoscopic technique and a device using an autostereoscopic technique.

The stereoscopic technique, which uses a parallax image of left and right eyes of a user with a high stereoscopic effect, includes a glass method and a non-glass method which have been put to practical use. In the glass method, a left and right parallax image is displayed on a direct view-based display device or a projector by changing a polarization direction of the left and right parallax image, and a stereoscopic image is implemented by using polarization glasses or liquid crystal shutter glasses. In the non-glass method, generally, an optical plate such as a parallax barrier or the like for separating an optical axis of the left and right parallax image is installed in front of or behind a display screen.

U.S. Pat. No. 5,821,989 and US Laid Open Publication No. US2008022949A1 are known to disclose an example of the glass type stereoscopic image display.

FIGS. 1 and 2 are schematic views of a glass type stereoscopic image display. As illustrated, the part seen in black of a liquid crystal shutter glasses (ST) represents a shutter blocking light that proceeds toward an observer (i.e., viewer), and the part seen in white of the liquid crystal shutter glasses (ST) represents a shutter allowing transmission of light toward the observer.

FIG. 1 illustrates a time-division operation of a left/right image when an impulse type display device is selected in the glass type stereoscopic image display. In the impulse type display device such as a cathode ray tube (CRT), immediately after data is completely written in a scanning direction, data of each pixel is erased.

In the stereoscopic image display illustrated in FIG. 1, during an odd-numbered frame period, the left eye shutter of the liquid crystal shutter glasses (ST) is open, and left-eye image data ($RGB_L$) are sequentially scanned on the impulse type display device (DIS1). During an even-numbered frame period, the right-eye shutter of the liquid crystal shutter glasses (ST) is open and right-eye image data ($RGB_L$) are sequentially scanned on the impulse type display device (DIS1). Accordingly, the observer can view only a left-eye image during the odd-numbered frame period and a right-eye image during the even-numbered period, feeling solidity.

FIG. 2 illustrates a time-division operation of a left/right image when a hold type display device is selected in the glass type stereoscopic image display. In the hold type display device such as a liquid crystal display (LCD) device, data written in pixels are maintained until such time as data is written at a first line during a next frame period following a response completion time point after the data is written at the entire pixels due to response time delay characteristics.

In the stereoscopic image display illustrated in FIG. 2, during the odd-numbered frame period, the left-eye shutter of the liquid crystal shutter glasses (ST) is open and left-eye image data ($RGB_L$(Fn)) of nth frame (n is a positive integer) are sequentially scanned on a hold type display device (DIS2). While the left-eye shutter of the liquid crystal shutter glasses (ST) is open, some pixels, to which the left-eye image data ($RGB_L$(Fn)) of the nth frame have not been written yet in the hold type display device (DIS2), maintain right-eye image data ($RGB_R$(Fn-1)) which had been already charged in (n-1)th frame. Accordingly, the observer can view an image of the right eye image data ($RGB_R$(Fn-1) of the (n-1)th frame with his left eye, as well as the left-eye image data ($RGB_L$(Fn)) of the nth frame during the nth frame.

In the stereoscopic image display illustrated in FIG. 2, during (n+1)th frame period, the right-eye shutter of the liquid crystal shutter glasses (ST) is open and right-eye image data ($RGB_R$(Fn)) of (n+1)th frame are sequentially scanned on the hold type display device (DIS2). While the right-eye shutter of the liquid crystal shutter glasses (ST) is open, some pixels, to which the right-eye image data ($RGB_R$(Fn)) of the (n+1)th frame have not been written yet in the hold type display device (DIS2), maintain left-eye image data ($RGB_L$(Fn)) which had been already charged in nth frame. Accordingly, the observer can view an image of the left eye image data ($RGB_L$(Fn) of the nth frame with his right eye, as well as the right-eye image data ($RGB_R$(Fn)) of the (n+1)th frame during the (n+1)th frame.

As noted in FIG. 2, when the hold type display device (DISP2) is used in the glass type stereoscopic image display, the observer can feel a pseudo-stereoscopic vision at a time when the left-eye image is changed to the right-eye image or at a time when the right-eye image is changed to the left-eye image.

Thus, in order to improve the degradation of picture quality due to the response time delay of the stereoscopic image display as shown in FIG. 2, US Laid Open Publication NO. 2007022949A1 discloses a technique of addressing data more quickly than the related art on a liquid crystal panel without increasing a frame rate and extending a vertical blanking period. Also, this publication proposes a method of opening liquid crystal shutter glasses (ST) during a time period obtained by subtracting a liquid crystal response time from the extended vertical blanking period. In proposed method, the vertical blanking period without data is lengthened and an opening duration of the liquid crystal shutter glasses is reduced, making an observer feel flickering. In addition, constructive interference occurs between light that transmits through the liquid crystal shutter and ambient light according to a correlation between an ON/OFF period of the liquid crystal shutter and that of the ambient light such as a fluorescent lamp, making the observer feel flicking more severely.

SUMMARY

An aspect of this document is to provide a stereoscopic image display capable of enhancing display quality of a stereoscopic image regardless of types of display devices in a glass type stereoscopic display, and a driving method thereof.

In an aspect, a stereoscopic image display comprises: a display device that time-division displays left-eye image data and right-eye image data; shutter glasses comprising a left-eye shutter and a right-eye shutter alternately turned on and off in synchronization with the display device; and a backlight unit that irradiates light to the display device and is periodically turned on and off such that the backlight unit is turned on when a predetermined time determined according to a response time of liquid crystal lapses from a start point of a frame period.

The stereoscopic image display may further comprise: a controller that controls an operation timing of the display device, the shutter glasses, and the backlight unit and supplies the left-eye image data and the right-eye image data to a data driver of the display device.

The controller may control the operation timing of the display device, the shutter glasses and the backlight unit based on a frame frequency of 200 Hz or higher.

The display device may repeatedly address the left-eye image data twice during an nth frame period and an (n+1)th frame period, and repeatedly address the right-eye image data twice during an (n+2)th frame period and an (n+3)th frame period, and the backlight unit may be turned on when a certain time lapses after a start point of the (n+1)th frame period and turned off at an end point of the (n+1)th frame period, and may be turned on when a certain time lapses after a start point of the (n+3)th frame period and turned off at an end point of the (n+3)th frame period.

The display device may address the left-eye data during the nth frame period, address black data during the (n+1)th frame period, address the right-eye image data during the (n+2)th frame period, and then address the black data during the (n+3)th frame period, and the backlight unit may be turned on when a certain time lapses after a start point of the nth frame period and turned off at the end point of the (n+1)th frame period, and may be turned on when a certain time lapses after a start point of the (n+2)th frame period and turned off at the end point of the (n+3)th frame period.

The display device may address left-eye data having first gamma characteristics during the nth frame period, address left-eye image data having second gamma characteristics during the (n+1)th frame period, address right-eye image data having first gamma characteristics during the (n+2)th frame period, and then address right-eye image data having second gamma characteristics during the (n+3)th frame period, and the backlight unit may be turned on when a certain time lapses after a start point of the nth frame period and turned off at the end point of the (n+1)th frame period, and may be turned on when a certain time lapses after a start point of the (n+2)th frame period and turned off at the end point of the (n+3)th frame period.

The left-eye shutter of the shutter glasses may be open during the nth frame period and the (n+1)th frame period, and the right-eye shutter of the shutter glasses may be open during the (n+2)th frame period and the (n+3)th frame period.

In another aspect, a method of driving a stereoscopic image display comprises: time-division displaying left-eye image data and right-eye image data on a display device; alternately turning on and off a left-eye shutter and a right-eye shutter of shutter glasses in synchronization with the display device; and turning on and off a backlight unit that irradiates light to the display device such that the backlight unit is turned on when a predetermined time determined according to a response time of liquid crystal lapses from a start point of a frame period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

The foregoing and other objects, features, aspects and advantages of the present invention will become more apparent from the following detailed description of the present invention when taken in conjunction with the accompanying drawings.

Exemplary embodiments of the present invention will now be described in detail with reference to FIGS. 3 to 11C.

Figure 1:
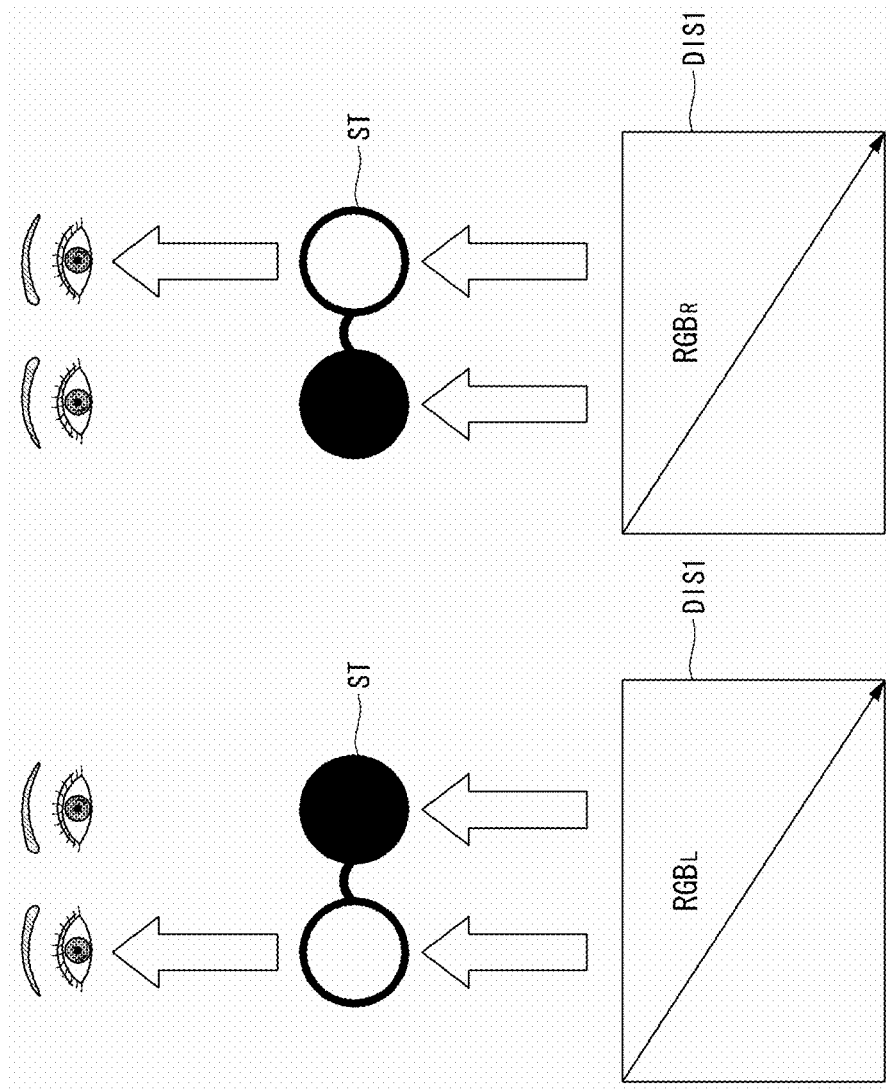
FIG. 1 illustrates a time-division operation of a left/right image when an impulse type display device is selected in the glass type stereoscopic image display.
Figure 2:
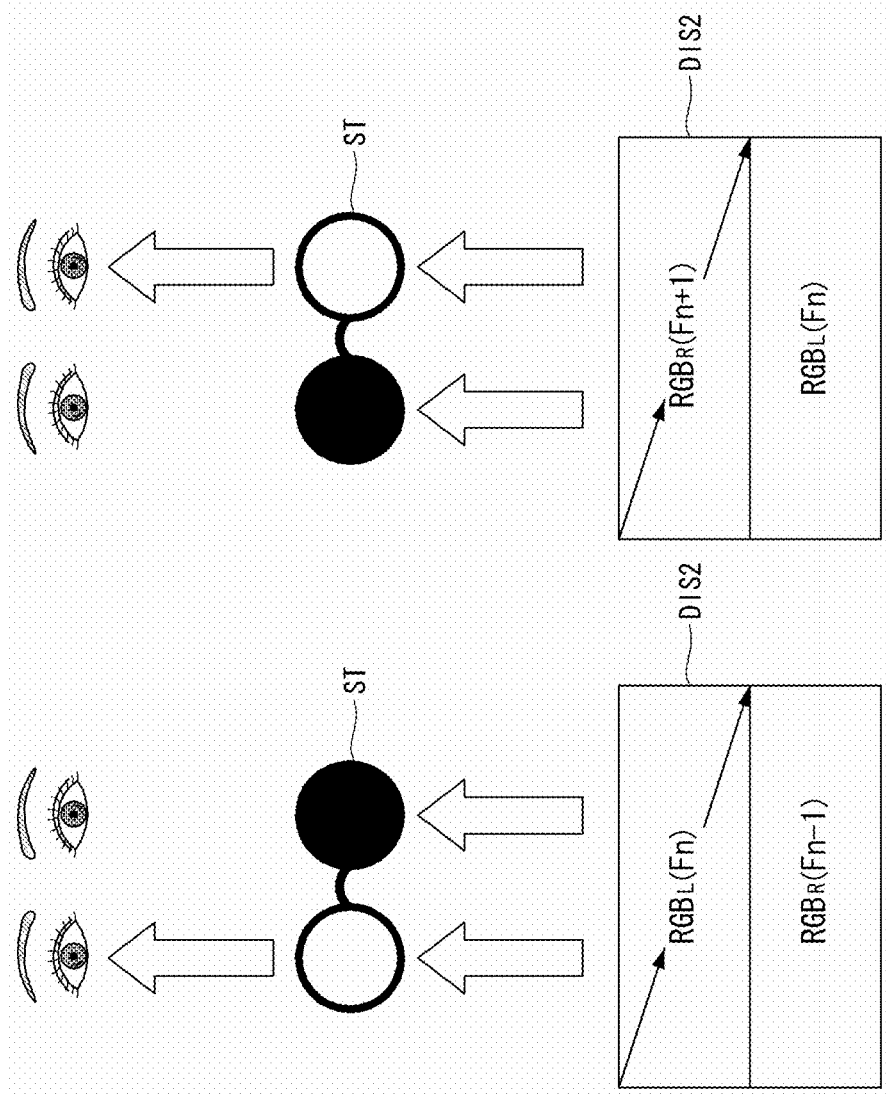
FIG. 2 illustrates a time-division operation of a left/right image when a hold type display device is selected in the glass type stereoscopic image display.
Figure 3:
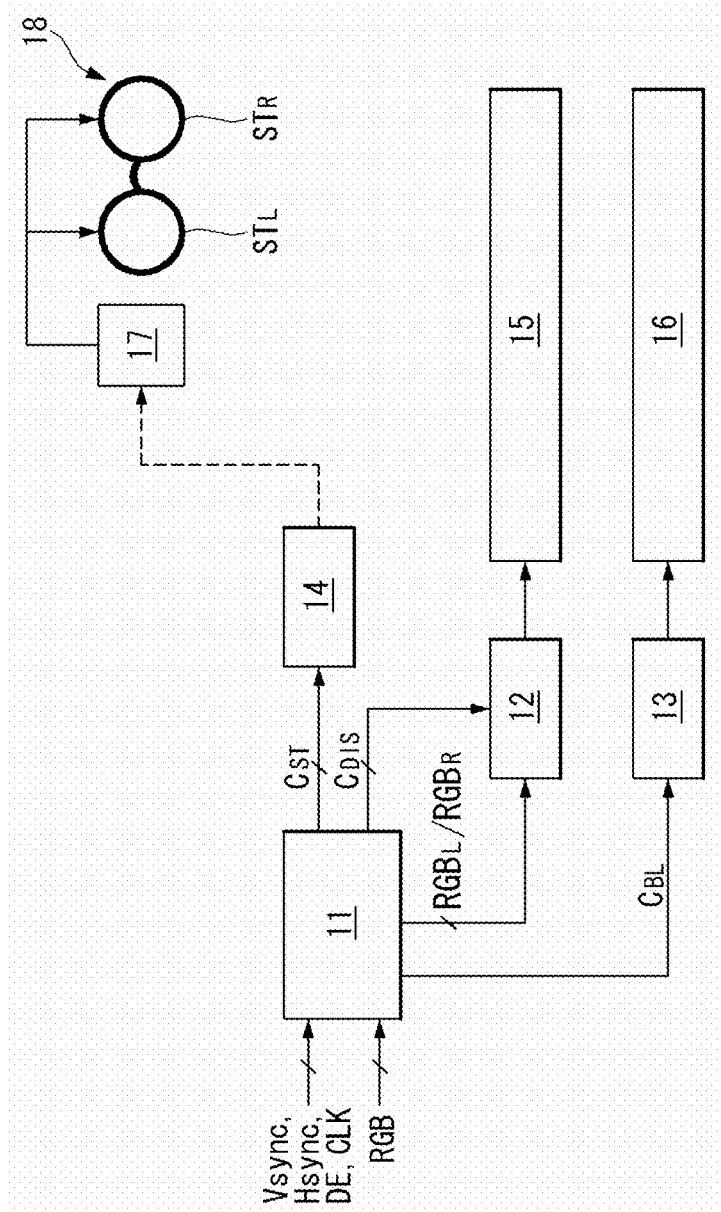
FIG. 3 is a schematic block diagram of a stereoscopic image display according to an exemplary embodiment of the present invention.

With reference to FIG. 3, a stereoscopic image display according to an exemplary embodiment of the present invention includes a display panel 15, a backlight unit 16, liquid crystal shutter glasses 18, a controller 11, a display panel driving circuit 12, a backlight driving circuit 13, a liquid crystal shutter control signal transmission unit 14, and a liquid crystal shutter control signal reception unit 17.

The display panel 15 is a transmission type display panel that alternately displays left-eye image data and right-eye image data under the control of the controller 11. The display panel 15 may be implemented as a transmission type liquid crystal panel that modulates light from the backlight unit 16 according to a data voltage applied to a liquid crystal layer. The transmission type liquid crystal panel includes a thin film transistor (TFT) substrate and a color filter substrate. The liquid crystal layer is formed between the TFT substrate and the color filter substrate. On the TFT substrate, data lines and gate lines (or scan lines) are formed to cross each other on a lower glass substrate, and liquid crystal cells are disposed in a matrix form at cell areas defined by the data lines and the gate lines. TFTs formed at crossings of the data lines and gate lines transfer a data voltage supplied by way of the data lines to pixel electrodes of the liquid crystal cells in response to scan pulses from the gate lines. To this end, a gate electrode of the TFT is connected to the gate line, and a source electrode of the TFT is connected to the gate line. A drain electrode of the TFT is connected to the pixel electrode of the liquid crystal cell. A common voltage is applied to a common electrode facing the pixel electrode. The color filter substrate includes black matrixes and color filters formed on an upper glass substrate. In a vertical field driving mode such as a twisted nematic (TN) mode and a vertical alignment (VA) mode, the common electrode is formed on the upper glass substrate, and in a horizontal field driving mode such as an in-plane switching (IPS) mode and a fringe field switching (FFS) mode, the common electrode is formed together with pixel electrodes on the lower glass substrate. Polarizers are attached to the upper and lower glass substrates of the transmission type liquid crystal panel, respectively, and in addition, an alignment film is formed to set a pre-tilt angle of liquid crystal. A spacer is formed between the upper and lower glass substrates of the transmission type liquid crystal panel to maintain a cell gap of the liquid crystal layer. Besides the liquid crystal modes such as TN mode, the VA mode, the IPS mode, and the FFS mode, the transmission type liquid crystal panel may be implemented in any other liquid crystal mode.

The display panel driving circuit 12 includes a data driving circuit and a gate driving circuit. The data driving circuit converts digital video data of left-eye and right-eye images inputted from the controller 11 into positive polarity and negative polarity gamma compensation voltages to generate positive polarity and negative polarity analog data voltages. The positive polarity and negative polarity analog data voltages outputted from the data driving circuit are supplied to the data lines of the display panel 15. The gate driving circuit sequentially supplies gate pulses (or scan pulses) in synchronization with the data voltages to the gate lines of the display panel 15.

The backlight unit 16 is turned on during a predetermined time to irradiate light to the display panel, and is turned off during other time periods. The backlight unit 16 is repeatedly turned on and off periodically. The backlight unit 16 includes a light source turned on according to driving power supplied from the backlight driving circuit 13, a light guide plate (or diffusion plate), a plurality of optical sheets, and the like. The backlight unit 16 may be implemented as a direct type backlight unit or an edge type backlight unit. The light source of the backlight unit 16 may include one or two or more of a HCFL (Hot Cathode Fluorescent Lamp), a CCFL (Cold Cathode Fluorescent Lamp), an EEFL (External Electrode Fluorescent Lamp), and an LED (Light Emitting Diode).

The backlight driving circuit 13 generates driving power to turn on the light source. The backlight driving circuit 13 supplies the driving power to the light source at predetermined times under the control of the controller 11.

The liquid crystal shutter glasses 18 include a left-eye shutter $ST_L$ and a right-eye shutter $ST_R$ which are separately controlled electrically. The left-eye shutter $ST_L$ and the right-eye shutter $ST_R$ includes a first transparent substrate, a first transparent electrode formed on the first transparent substrate, a second transparent substrate, a second transparent electrode formed on the second transparent substrate, and a liquid crystal layer supported between the first and second transparent substrates, respectively. A reference voltage is applied to the first transparent electrode, and an ON/OFF voltage is supplied to the second transparent electrode. When the ON voltage is supplied to the second transparent electrode, the left-eye shutter $ST_L$ and the right-eye shutter $ST_R$ allow light from the display panel 15 to transmit therethrough, while when the OFF voltage is supplied to the second transparent electrode, the left-eye shutter $ST_L$ and the right-eye shutter $ST_R$ intercept light from the display panel 15.

The liquid crystal shutter control signal transmission unit 14 connected with the controller 11 transmits a liquid crystal shutter control signal $C_{ST}$ inputted from the controller 11 to the liquid crystal shutter control signal reception unit 17 via a wireline/wireless interface. The liquid crystal shutter control signal reception unit 17 installed within the liquid crystal shutter glasses 18 receives the liquid crystal shutter control signal $C_{ST}$ via the wireline/wireless interface, and alternately opens and closes the left-eye shutter $ST_L$ and the right-eye shutter $ST_R$ of the liquid crystal shutter glasses 17 according to the liquid crystal shutter control signal $C_{ST}$. When the liquid crystal shutter control signal $C_{ST}$ is inputted as a first logic value to the liquid crystal shutter control signal reception unit 17, the ON voltage is supplied to the second transparent electrode of the left-eye shutter $ST_L$ while the OFF voltage is supplied to the second transparent electrode of the right-eye shutter $ST_R$. When the liquid crystal shutter control signal $C_{ST}$ is inputted as a second logic value to the liquid crystal shutter control signal reception unit 17, the OFF voltage is supplied to the second transparent electrode of the left-eye shutter $ST_L$ while the ON voltage is supplied to the second transparent electrode of the right-eye shutter $ST_R$. Accordingly, the left-eye shutter $ST_L$ of the liquid crystal shutter glasses 18 is open when the liquid crystal shutter control signal $C_{ST}$ is generated as the first logic value, and the right-eye shutter $ST_R$ of the liquid crystal shutter glasses 18 is open when the liquid crystal shutter control signal $C_{ST}$ is generated as the second logic value. In the embodiment described hereinafter, the first logic value is expressed as a high logic voltage and the second logic value is expressed as a low logic voltage. However, the first logic value may be generated as a low logic voltage while the second logic value may be generated as a high logic voltage.

The controller 11 receives timing signals and digital video data RGB from a video source (not shown). The timing signals include a vertical synchronous signal Vsync, a horizontal synchronous signal Hsync, a data enable signal DE, a dot clock (CLK), and the like.

Figure 5:
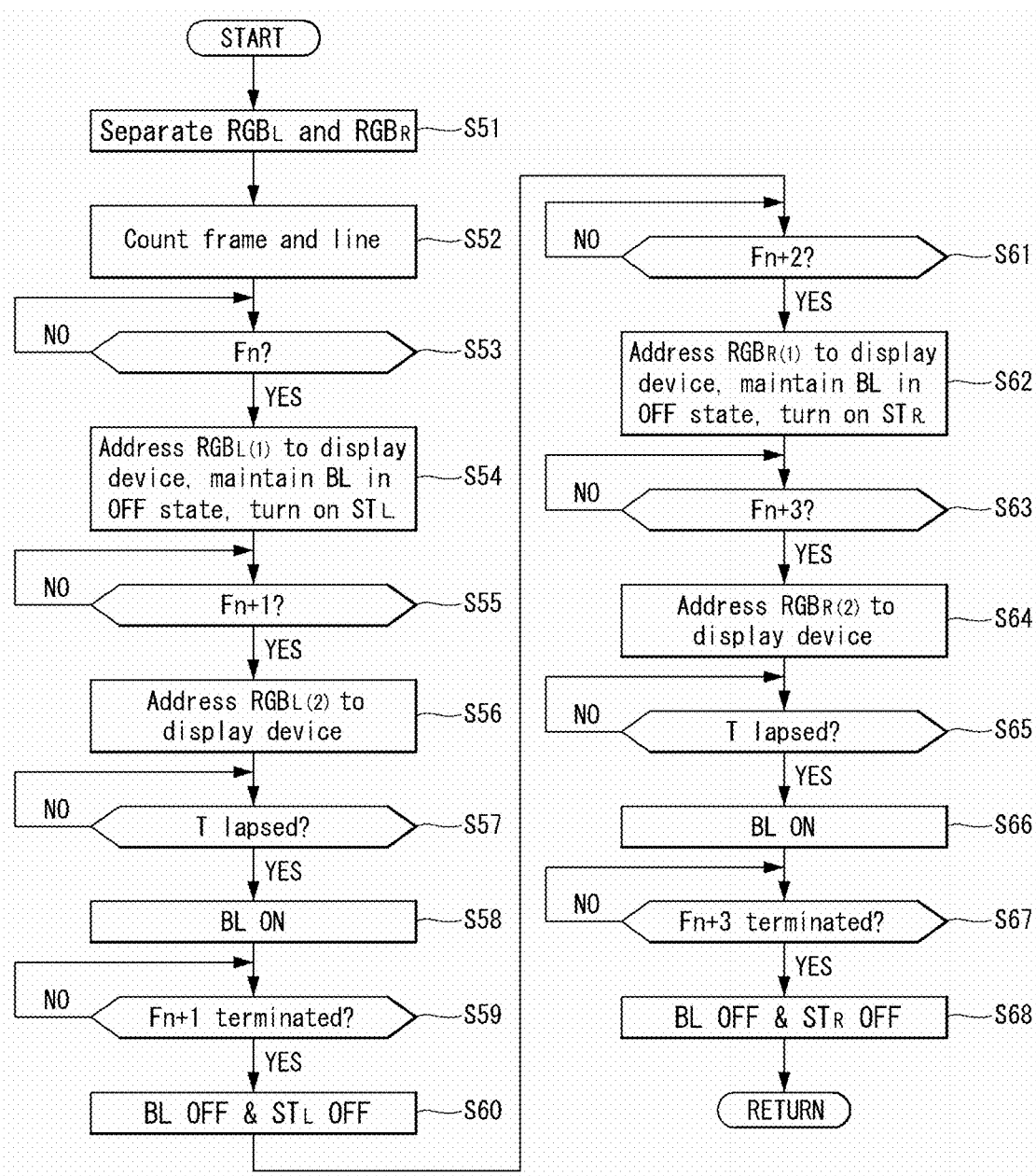
FIG. 5 is a flow chart illustrating the process of a method of driving a stereoscopic image display according to a first exemplary embodiment of the present invention.
Figure 6:
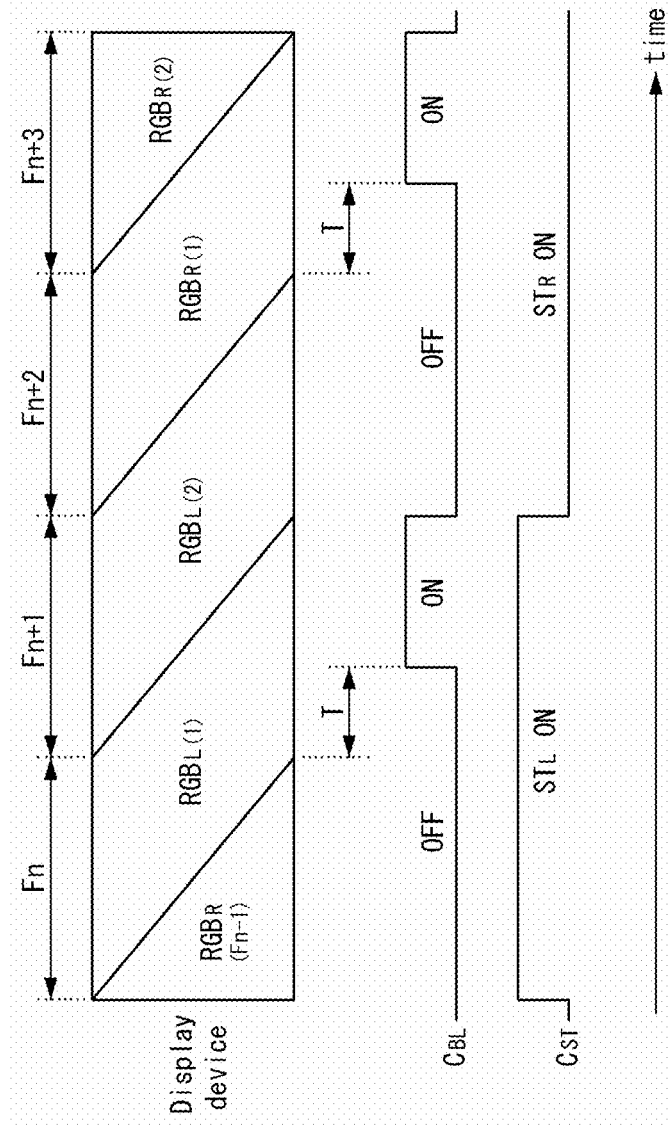
FIG. 6 is a waveform view of the stereoscopic image display according to the first exemplary embodiment of the present invention.
Figure 7:
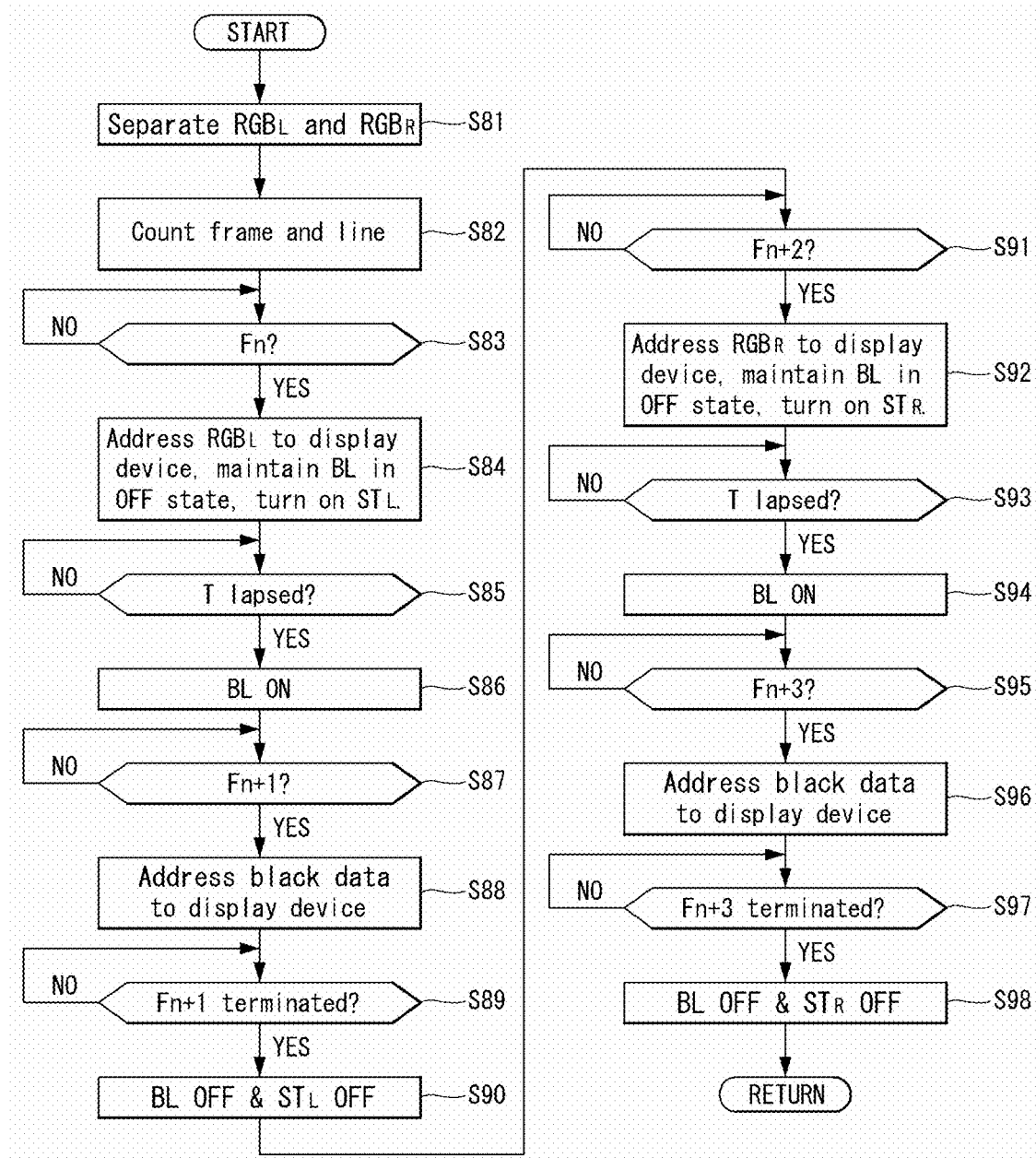
FIG. 7 is a flow chart illustrating the process of a method of driving a stereoscopic image display according to a second exemplary embodiment of the present invention.
Figure 8:
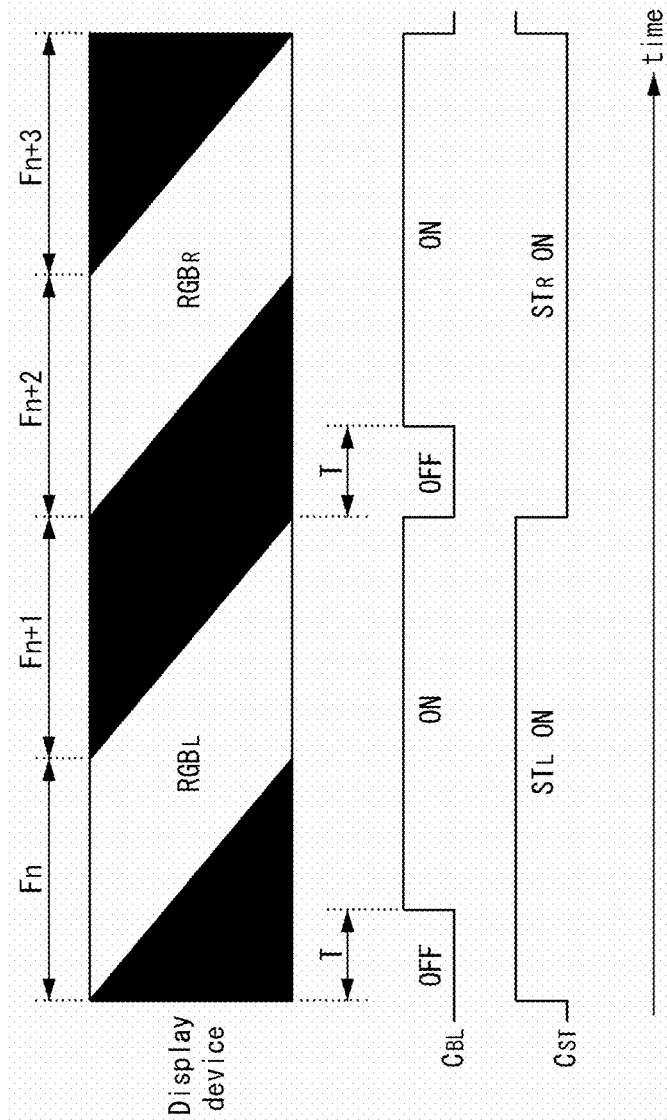
FIG. 8 is a waveform view of the stereoscopic image display according to the second exemplary embodiment of the present invention.
Figure 9:
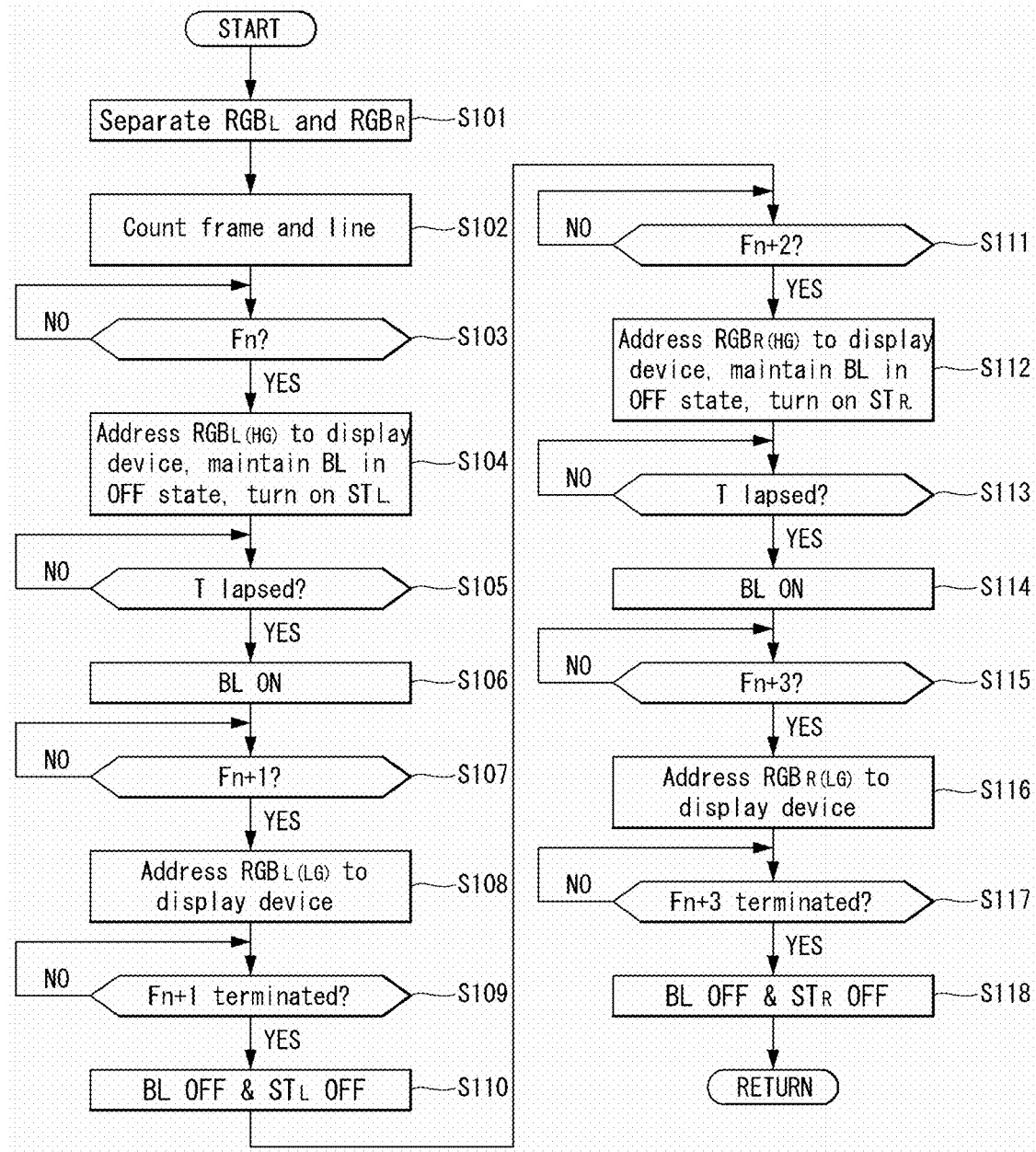
FIG. 9 is a flow chart illustrating the process of a method of driving a stereoscopic image display according to a third exemplary embodiment of the present invention.
Figure 10:
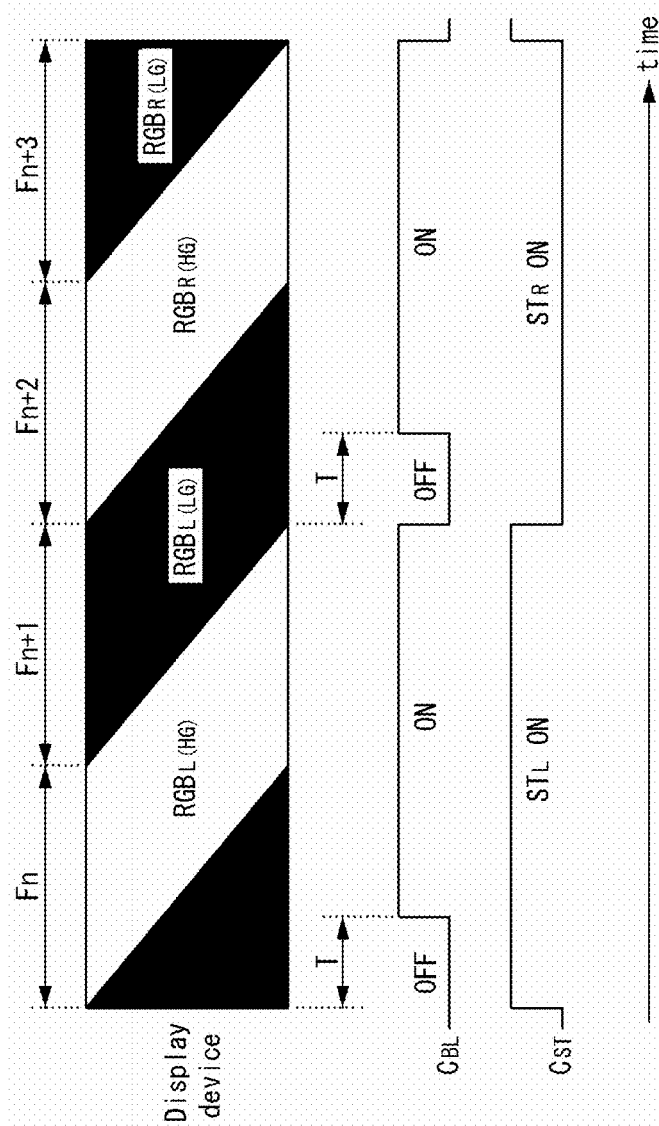
FIG. 10 is a waveform view of the stereoscopic image display according to the third exemplary embodiment of the present invention.
Figure 11A:
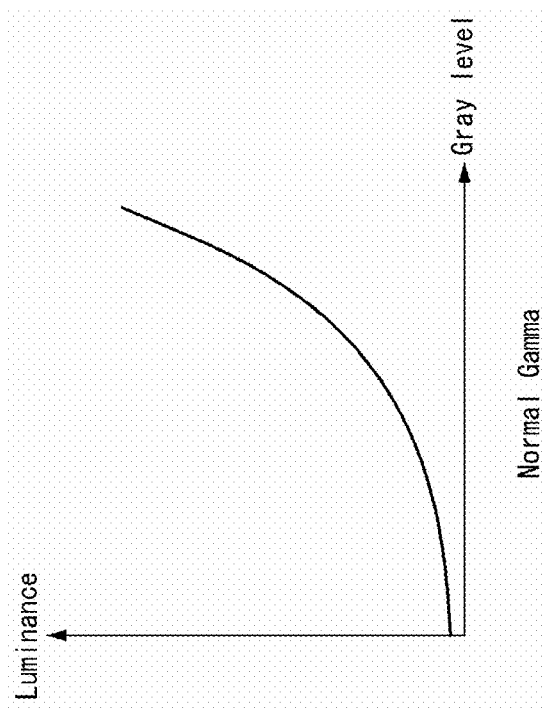
FIGS. 11A to 11C are graphs showing a normal gamma characteristics curve, a high gamma characteristics curve, and a low gamma characteristics curve.
Figure 11B:
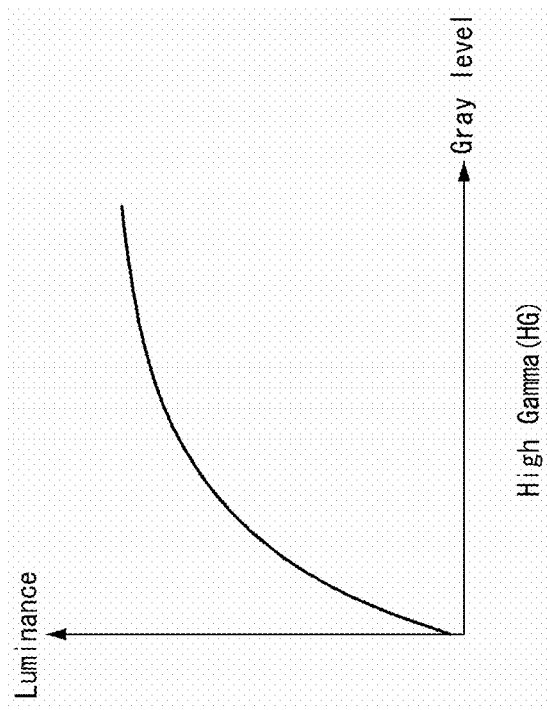

The controller 11 separates left-eye image data $RGB_L$ and right-eye image data $RGB_R$ from the digital video data RGB inputted from the video source, repeatedly supplies the left-eye image data $RGB_L$ to the data driving circuit during Nth frame (N is a positive integer of 2 or larger) period, and then supplies the right-eye image data $RGB_R$ to the data driving circuit during a next Nth frame period according to the data sequences as shown in FIGS. 5 and 6. In a different exemplary embodiment, the controller 11 alternately supplies the left-eye image data $RGB_L$ and black data to the data driving circuit during the Nth frame period, and then alternately supplies the right-eye image data $RGB_R$ and black data to the data driving circuit during a next Nth frame period as shown in FIGS. 7 and 8. In a still different exemplary embodiment, the controller 11 may differently control the gamma characteristics of the left-eye image data $RGB_L$ continuously supplied to the data driving circuit during the Nth frame period, and may differently control the gamma characteristics of the right-eye image data $RGB_R$ continuously supplied to the data driving circuit during the Nth frame period as shown in FIGS. 9 to 11.

The controller 11 multiplies a frame frequency by N times, preferably, by four or more times, the input frame frequency, and generates a display panel control signal $C_{DIS}$, a backlight control signal $C_{BL}$, and the liquid crystal shutter control signal $C_{ST}$ based on the multiplied frame frequency. The input frame frequency is 50 Hz in a phase alternate line (PAL) scheme and 60 Hz in a national television standards committee (NTSC) scheme. Accordingly, when multiplying the input frame frequency four times, the controller 11 multiplies the frequency of the display panel control signal $C_{DIS}$, the backlight control signal $C_{BL}$, and the liquid crystal shutter control signal $C_{ST}$ based on the frame frequency of 200 Hz or higher. When the frame frequency is 200 Hz, a single frame period is 5 msec, and when the frame frequency is 240 Hz, a single frame period is about 4.16 msec.

The display panel control signal CDIS includes a data control signal for controlling an operation timing of the data driving circuit and a gate control signal for controlling an operation timing of the gate driving circuit. The data control signal includes a source start pulse SSP, a source sampling clock SSC, a source output enable signal SOE, a polarity control signal POL, and the like. The source start pulse SSP controls a data sampling start point of the data driving circuit. The source sampling clock SSC is a clock signal for controlling a sampling operation of the data driving circuit based on a rising edge or a falling edge. If digital video data to be inputted to the data driving circuit is transmitted according to a mini LVDS (Low Voltage Differential Signaling) interface standard, the source start pulse SSP and the source sampling clock SSC may be omitted. The polarity control signal POL reverses the polarity of a data voltage outputted from the data driving circuit at n (n is a positive integer) horizontal periods. The source output enable signal SOE controls an output timing of the data driving circuit. The gate control signal includes a gate start pulse GSP, a gate shift clock GSC, a gate output enable signal GOE, and the like. The gate start pulse GSP controls a timing of a first gate pulse. The gate shift clock GSC is a clock signal for shifting the gate start pulse GSP. The gate output enable signal GOE controls an output timing of the gate driving circuit.

The backlight control signal $C_{BL}$ controls the backlight driving circuit 13 to periodically turn on and turn off the light source of the backlight unit 16 as shown in FIGS. 5 to 10. The liquid crystal shutter control signal $C_{ST}$ is transmitted to the liquid crystal shutter control signal transmission unit 14 to alternately open and close the left-eye shutter $ST_L$ and the right-eye shutter $ST_R$ of the liquid crystal shutter glasses 18.

Figure 4:
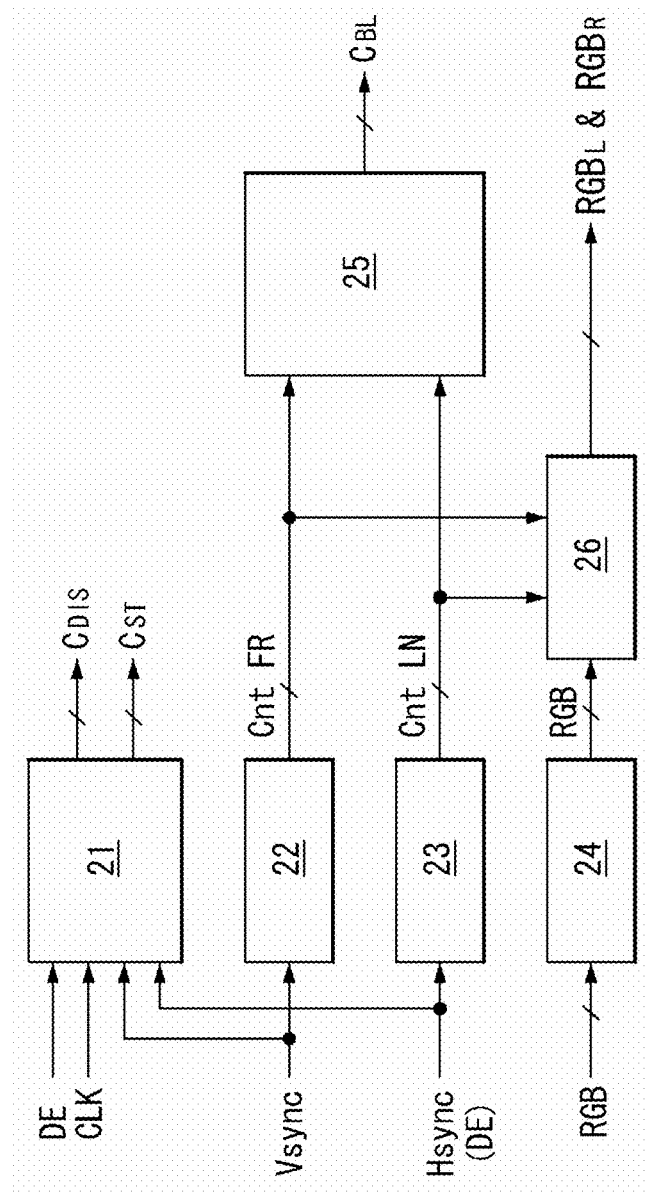
FIG. 4 is a detailed block diagram of a controller in FIG. 3.

FIG. 4 is a detailed view of the controller 11.

With reference to FIG. 4, the controller 11 includes a first control signal generating unit 21, a frame counter 22, a line counter 23, a second control signal generating unit 25, a memory 24, and a data separating unit 26.

The first control signal generating unit 21 generates a display panel control signal $C_{DIS}$ and the liquid crystal shutter control signal $C_{ST}$ as shown in FIGS. 5 to 10 by using timing signals inputted from the video source.

The frame counter 22 counts a signal having a pulse generated one time during one vertical period (or one frame period) such as the vertical synchronous signal Vsync or the gate start pulse GSP, to generate a frame count signal Cnt_FR. The line counter 23 counts a signal having a pulse generated one time during one horizontal period such as the horizontal synchronous signal Hsync or the data enable signal DE, to generate a line count signal Cnt_LN.

The second control signal generating unit 25 generates a backlight control signal $C_{BL}$ as shown in FIGS. 5 to 10 upon receiving the frame count signal Cnt_FR and the line count signal Cnt_LN.

The memory 24 temporarily stores the input digital video data RGB. The left-eye image data $RGB_L$ and the right-eye image data $RGB_R$ may be alternately encoded in units of one frame to the input digital video data RGB. When the left-eye image data $RGB_L$ and the right-eye image data $RGB_R$ are alternately encoded in units of one frame to the input digital video data RGB, the memory 24 is selected as a frame memory. Meanwhile, the left-eye image data $RGB_L$ and the right-eye image data $RGB_R$ may be alternately encoded in units of one line to the input digital video data RGB. When the left-eye image data $RGB_L$ and the right-eye image data $RGB_R$ are alternately encoded in units of one line to the input digital video data RGB, the memory 24 may be selected as a line memory.

The data separating unit 26 may realign the digital video data RGB inputted from the memory 24 to separate the left-eye image data $RGB_L$ and the right-eye image data $RGB_R$, and transmits the left-eye image data $RGB_L$ and the right-eye image data $RGB_R$ according to the data sequence as shown in FIGS. 5 to 10. The data separating unit 26 may insert black data behind the left-eye image data $RGB_L$ and the right-eye image data $RGB_R$, respectively. In addition, as shown in FIGS. 9 to 11, the data separating unit 26 may differently convert gamma characteristics of the continued left-eye image data $RGB_L$ in units of one frame period, and may differently convert gamma characteristics of the continued right-eye image data $RGB_R$ in units of one frame period.

A method of driving a stereoscopic image display according to exemplary embodiments of the present invention will now be described with reference to FIGS. 5 to 11C. In FIGS. 5, 7, and 9, 'BL' denotes the backlight unit 16, and 'STL' and 'STR' denote the left-eye shutter and right-eye shutter of the liquid crystal shutter glasses 18, respectively.

FIG. 5 is a flow chart illustrating the process of a method of driving a stereoscopic image display according to a first exemplary embodiment of the present invention. FIG. 6 is a waveform view of the stereoscopic image display according to the first exemplary embodiment of the present invention. The first exemplary embodiment will now be described in detail in association with the stereoscopic image display illustrated in FIGS. 3 and 4.

With reference to FIGS. 5 and 6, the controller 11 separates left-eye image data $RGB_L$ and right-eye image data $RGB_R$ from input digital video data RGB by using the memory 24 (S51). The controller 11 counts a current frame period and lines to be displayed, respectively, generates a display panel control signal $C_{DIS}$ during the nth frame period Fn, and supplies first left-eye image data $RGB_{L(1)}$ to the data driving circuit. At the same time, the controller 11 generates a backlight control signal with a low logic level and a liquid crystal shutter control signal $C_{ST}$ with a high logic level (S52 to S54). The data driving circuit supplies a data voltage of the first left-eye image data $RGB_{L(1)}$ to the data lines of the display panel 15 during the nth frame period Fn to address the first left-eye image data $RGB_{L(1)}$ to pixels of the display panel 15. The backlight driving circuit 13 turns off the light source in response to the backlight control signal $C_{BL}$ of the low logic level during the nth frame period Fn. The liquid crystal shutter control signal reception unit 17 opens the left-eye shutter $ST_L$ and shuts the right-eye shutter $ST_R$ in response to the liquid crystal shutter control signal $C_{ST}$ of the high logic level during the nth frame period Fn.

If a current frame period is determined to be the (n+1)th frame period Fn+1 according to the result of counting the frame period, the controller 11 generates a display panel control signal $C_{DIS}$, supplies second left-eye image data $RGB_{L(2)}$ to the data driving circuit, and maintains the liquid crystal shutter control signal $C_{ST}$ at the high logic level (S55 and S56). Subsequently, the controller 11 reverses the backlight control signal $C_{BL}$ to have a high logic level at a time point when a predetermined time T has elapsed from a start point of the (n+1)th frame period Fn+1 according to the result of counting lines (S57 and S58). The predetermined time T may be determined within a time period larger than 0 but shorter than one frame period, and may be determined to be a certain time following a response time of the liquid crystal through experimentation. The data driving circuit supplies a data voltage of the second left-eye image data $RGB_{L(2)}$ to the data lines of the display panel 15 during the (n+1)th frame period Fn+1 to address the second left-eye image data $RGB_{L(2)}$ to the pixels of the display panel 15. In response to the backlight control signal $C_{BL}$ of the high logic level, the backlight driving circuit 13 turns on the light source of the backlight unit 16 at a time point when the predetermined time T has elapsed after the start point of the (n+1)th frame period Fn+1. The liquid crystal shutter control signal reception unit 17 opens the left-eye shutter $ST_L$ and shuts the right-eye shutter $ST_R$ in response to the liquid crystal shutter control signal $C_{ST}$ of the high logic level during the (n+1)th frame period Fn+1.

The controller 11 may determine a start point, an end point, and the T lapse time point within a frame period according to the line count result. For example, a time point of frame period×1 corresponds to a start point of a corresponding frame period, and a time point of frame period×a total line number of the display panel corresponds to an end point of the corresponding frame. The line number corresponding to frame period×T corresponds to a time point when the time period T has lapsed from the start point of the corresponding frame.

If a current time is determined to be an end point of the (n+1)th frame period Fn+1 according to the result of counting the frame period and lines, the controller 11 reverses the backlight control signal $C_{BL}$ to have a low logic level, and then reverses the liquid crystal shutter control signal $C_{ST}$ to have a low logic level within a blanking period following the end point of the (n+1)th frame period Fn+1 (S59 and S60). The backlight driving circuit 13 turns off the light source of the backlight unit 16 in response to the backlight control signal $C_{BL}$ of the low logic level at the end point of the (n+1)th frame period. The liquid crystal shutter control signal reception unit 17 shuts the left-eye shutter $ST_L$ and opens the right-eye shutter $ST_R$ within the blanking period following the end point of the (n+1)th frame period Fn+1 in response to the liquid crystal shutter control signal $C_{ST}$ of the low logic level.

If a current frame period is determined to be the (n+2)th frame period Fn+2 according to the result of counting the frame period, the controller 11 generates a display panel control signal $C_{DIS}$ and supplies the first right-eye image data $RGB_{R(1)}$ to the data driving circuit. At the same time, the controller 11 generates a backlight control signal $C_{BL}$ with a low logic level and the liquid crystal shutter control signal $C_{ST}$ with a low logic level (S61 and S62). The data driving circuit supplies the data voltage of the first right-eye image data $RGB_{R(1)}$ to the data lines of the display panel 15 during the (n+2)th frame period Fn+2 to address the first right-eye image data $RGB_{R(1)}$ to the pixels of the display panel 15. The backlight driving circuit 13 turns off the light source in response to the backlight control signal $C_{BL}$ of the low logic value during the (n+2)th frame period Fn+2. The liquid crystal shutter control signal receiving unit 17 shuts the left-eye shutter $ST_L$ and opens the right-eye shutter $ST_R$ in response to the liquid crystal shutter control signal $C_{ST}$ of the low logic level during the (n+2)th frame period Fn+2.

If a current frame period is determined to be the (n+3)th frame period Fn+3 according to the result of counting the frame period, the controller 11 generates a display panel control signal $C_{DIS}$ and supplies the second right-eye image data $RGB_{R(2)}$ to the data driving circuit, and maintains the liquid crystal shutter control signal $C_{ST}$ at the low logic level (S63 and S64). Subsequently, the controller 11 reverses the backlight control signal $C_{BL}$ to have a high logic level at a time point when a predetermined time T has elapsed from a start point of the (n+3)th frame period Fn+3 according to the result of counting lines (S65 and S66). The predetermined time T may be determined within a time period larger than 0 but shorter than one frame period, and may be determined to be a predetermined time following a response time of the liquid crystal through experimentation. The data driving circuit supplies a data voltage of the second right-eye image data $RGB_{R(2)}$ to the data lines of the display panel 15 during the (n+3)th frame period Fn+3 to address the second right-eye image data $RGB_{L(2)}$ to the pixels of the display panel 15. In response to the backlight control signal $C_{BL}$ of the high logic level, the backlight driving circuit 13 turns on the light source of the backlight unit 16 at a time point when the predetermined time T has elapsed after the start point of the (n+3)th frame period Fn+3. The liquid crystal shutter control signal reception unit 17 shuts the left-eye shutter $ST_L$ and opens the right-eye shutter $ST_R$ in response to the liquid crystal shutter control signal $C_{ST}$ of the low logic level during the (n+3)th frame period Fn+3.

If a current time is determined to be an end point of the (n+3)th frame period Fn+3 according to the result of counting the frame period and lines, the controller 11 reverses the backlight control signal $C_{BL}$ to have a low logic level, and then reverses the liquid crystal shutter control signal $C_{ST}$ to have a high logic level within a blanking period following the (n+3)th frame period Fn+3 (S67 and S68). The backlight driving circuit 13 turns off the light source of the backlight unit 16 in response to the backlight control signal $C_{BL}$ of the low logic level at the end point of the (n+3)th frame period Fn+3. The liquid crystal shutter control signal reception unit 17 opens the left-eye shutter $ST_L$ and shuts the right-eye shutter $ST_R$ within the blanking period following the end point of the (n+3)th frame period Fn+3 in response to the liquid crystal shutter control signal $C_{ST}$ of the high logic level.

In FIGS. 5 and 6, the second left-eye image data $RGB_{L(2)}$ may be generated to be the same as the first left-eye image data $RGB_{L(1)}$, or may be generated as data to be the same as the first left-eye image data $RGB_{L(1)}$ but having different gamma characteristics. Likewise, the second right-eye image data $RGB_{R(2)}$ may be generated to be the same as the first right-eye image data $RGB_{R(1)}$, or may be generated as data to be the same as the first left-eye image data $RGB_{L(1)}$ but having different gamma characteristics.

FIG. 7 is a flow chart illustrating the process of a method of driving a stereoscopic image display according to a second exemplary embodiment of the present invention. FIG. 8 is a waveform view of the stereoscopic image display according to the second exemplary embodiment of the present invention. The second exemplary embodiment will now be described in detail in association with the stereoscopic image display illustrated in FIGS. 3 and 4.

With reference to FIGS. 7 and 8, the controller 11 separates left-eye image data $RGB_L$ and right-eye image data $RGB_R$ from input digital video data RGB by using the memory 24 (S81). The controller 11 counts a current frame period and lines to be displayed, respectively, generates a display panel control signal $C_{DIS}$ from a start point of the nth frame period Fn, supplies left-eye image data $RGB_L$ to the data driving circuit, and generates a liquid crystal shutter control signal $C_{ST}$ with a high logic level. The data driving circuit supplies a data voltage of the left-eye image data $RGB_L$ to the data lines of the display panel 15 during the nth frame period Fn to address the left-eye image data $RGB_L$ to the pixels of the display panel 15. The liquid crystal shutter control signal reception unit 17 opens the left-eye shutter $ST_L$ and shuts the right-eye shutter $ST_R$ in response to the liquid crystal shutter control signal $C_{ST}$ of the high logic level during the nth frame period Fn. Also, the controller 11 generates a backlight control signal $C_{BL}$ with a low logic level from a start point of the nth frame period Fn, determines a lapse time according to a line count value, and reverses the backlight control signal $C_{BL}$ to have a high logic level at a time point when a predetermined time T has elapsed from the start point of the nth frame period Fn (S82 to S86). The predetermined time T may be determined within a time period larger than 0 but shorter than one frame period, and may be determined to be a certain time following a response time of the liquid crystal through experimentation. In response to the backlight control signal $C_{BL}$ of the high logic level, the backlight driving circuit 13 turns on the light source of the backlight unit 16 at a time point when the predetermined time T has elapsed after the start point of the nth frame period Fn.

If a current frame period is determined to be the (n+1)th frame period Fn+1 according to the result of counting the frame period, the controller 11 generates a display panel control signal $C_{DIS}$, repeatedly supplies black data (e.g., digital data '0000 0000') stored in a register to the data driving circuit, and maintains the liquid crystal shutter control signal $C_{ST}$ at the high logic level (S87 and S88). The data driving circuit supplies a data voltage of the black data to the data lines of the display panel 15 during the (n+1)th frame period Fn+1 to address the black data to the pixels of the display panel 15. In response to the backlight control signal $C_{BL}$ of the high logic level, the backlight driving circuit 13 turns on the light source of the backlight unit 16 during the (n+1)th frame period Fn+1. The liquid crystal shutter control signal reception unit 17 opens the left-eye shutter $ST_L$ and shuts the right-eye shutter $ST_R$ in response to the liquid crystal shutter control signal $C_{ST}$ of the high logic level during the (n+1)th frame period Fn+1.

If a current time is determined to be an end point of the (n+1)th frame period Fn+1 according to the result of counting the frame period and lines, the controller 11 reverses the backlight control signal $C_{BL}$ to have a low logic level, and then reverses the liquid crystal shutter control signal $C_{ST}$ to have a low logic level within a blanking period following the end point of the (n+1)th frame period Fn+1 (S89 and S90). The backlight driving circuit 13 turns off the light source of the backlight unit 16 in response to the backlight control signal $C_{BL}$ of the low logic level at the end point of the (n+1)th frame period. The liquid crystal shutter control signal reception unit 17 shuts the left-eye shutter $ST_L$ and opens the right-eye shutter $ST_R$ within the blanking period following the end point of the (n+1)th frame period Fn+1 in response to the liquid crystal shutter control signal $C_{ST}$ of the low logic level.

If a current frame period is determined to be the (n+2)th frame period Fn+2 according to the result of counting the frame period, the controller 11 generates a display panel control signal $C_{DIS}$ from a start point of the (n+2)th frame period Fn+2, supplies right-eye image data $RGB_R$ to the data driving circuit, and generates a liquid crystal shutter control signal $C_{ST}$ with a low logic level. The data driving circuit supplies a data voltage of the right-eye image data $RGB_R$ to the data lines of the display panel 15 during the (n+2)th frame period Fn+2 to address the right-eye image data $RGB_R$ to the pixels of the display panel 15. The liquid crystal shutter control signal receiving unit 17 shuts the left-eye shutter $ST_L$ and opens the right-eye shutter $ST_R$ in response to the liquid crystal shutter control signal $C_{ST}$ of the low logic level during the (n+2)th frame period Fn+2. Also, the controller 11 generates a backlight control signal $C_{BL}$ from a start point of the (n+2)th frame period Fn+2, determines a lapse time according to a line count value, and reverses the backlight control signal $C_{BL}$ to have a high logic level at a time point when a predetermined time T has elapsed from the start point of the (n+2)th frame period Fn+2 (S91 to S94). The predetermined time T may be determined within a time period larger than 0 but shorter than one frame period, and may be determined to be a certain time following a response time of the liquid crystal through experimentation. In response to the backlight control signal $C_{BL}$ of the high logic level, the backlight driving circuit 13 turns on the light source of the backlight unit 16 at a time point when the predetermined time T has elapsed after the start point of the (n+2)th frame period Fn+2.

If a current frame period is determined to be the (n+3)th frame period Fn+3 according to the result of counting the frame period, the controller 11 generates a display panel control signal $C_{DIS}$, repeatedly supplies black data stored in the register to the data driving circuit, and maintains the liquid crystal shutter control signal $C_{ST}$ at the low logic level (S95 and S96). The data driving circuit supplies a data voltage of the black data to the data lines of the display panel 15 during the (n+3)th frame period Fn+3 to address the black data to the pixels of the display panel 15. In response to the backlight control signal $C_{BL}$ of the high logic level, the backlight driving circuit 13 turns on the light source of the backlight unit 16 during the (n+3)th frame period Fn+3. The liquid crystal shutter control signal reception unit 17 shuts the left-eye shutter $ST_L$ and opens the right-eye shutter $ST_R$ in response to the liquid crystal shutter control signal $C_{ST}$ of the low logic level during the (n+3)th frame period Fn+3.

If a current time is determined to be an end point of the (n+3)th frame period Fn+3 according to the result of counting the frame period and lines, the controller 11 reverses the backlight control signal $C_{BL}$ to have a low logic level, and then reverses the liquid crystal shutter control signal $C_{ST}$ to have a high logic level within a blanking period following the (n+3)th frame period Fn+3 (S97 and S98). The backlight driving circuit 13 turns off the light source of the backlight unit 16 in response to the backlight control signal $C_{BL}$ of the low logic level at the end point of the (n+3)th frame period Fn+3. The liquid crystal shutter control signal reception unit 17 opens the left-eye shutter $ST_L$ and shuts the right-eye shutter $ST_R$ within the blanking period following the end point of the (n+3)th frame period Fn+3 in response to the liquid crystal shutter control signal $C_{ST}$ of the high logic level.

FIG. 9 is a flow chart illustrating the process of a method of driving a stereoscopic image display according to a third exemplary embodiment of the present invention. FIG. 10 is a waveform view of the stereoscopic image display according to the third exemplary embodiment of the present invention. The third exemplary embodiment will now be described in detail in association with the stereoscopic image display illustrated in FIGS. 3 and 4.

With reference to FIGS. 9 and 10, the controller 11 separates left-eye image data $RGB_L$ and right-eye image data $RGB_R$ from input digital video data RGB by using the memory 24 (S101). The controller 11 counts a current frame period and lines to be displayed, respectively, generates a display panel control signal $C_{DIS}$ from a start point of the nth frame period Fn, supplies left-eye image data $RGB_{L(HG)}$ which has been modulated to have high gamma characteristics to the data driving circuit, and generates a liquid crystal shutter control signal $C_{ST}$ with a high logic level. The left-eye image data $RGB_{L(HG)}$, which has been modulated to have the high gamma characteristics, has a high display luminance at low and medium gray levels compared with normal gamma characteristics as shown in FIG. 11A. The data driving circuit supplies a data voltage of the left-eye image data $RGB_{L(HG)}$ modulated to have the high gamma characteristics to the data lines of the display panel 15 during the nth frame period Fn to address the left-eye image data $RGB_{L(HG)}$ to the pixels of the display panel 15. The liquid crystal shutter control signal reception unit 17 opens the left-eye shutter $ST_L$ and shuts the right-eye shutter $ST_R$ in response to the liquid crystal shutter control signal $C_{ST}$ of the high logic level during the nth frame period Fn. Also, the controller 11 generates a backlight control signal $C_{BL}$ with a low logic value from a start point of the nth frame period Fn, determines a lapse time according to a line count value, and reverses the backlight control signal $C_{BL}$ to have a high logic level at a time point when a predetermined time T has elapsed from the start point of the nth frame period Fn (S102 to S106). The predetermined time T may be determined within a time period larger than 0 but shorter than one frame period, and may be determined to be a certain time following a response time of the liquid crystal through experimentation. In response to the backlight control signal $C_{BL}$ of the high logic level, the backlight driving circuit 13 turns on the light source of the backlight unit 16 at a time point when the predetermined time T has elapsed after the start point of the nth frame period Fn.

If a current frame period is determined to be the (n+1)th frame period Fn+1 according to the result of counting the frame period, the controller 11 generates a display panel control signal $C_{DIS}$, supplies left-eye image data $RGB_{L(LG)}$, which has been modulated to have low gamma characteristics, to the data driving circuit, and maintains the liquid crystal shutter control signal $C_{ST}$ at the high logic level (S107 and S108). The data driving circuit supplies a data voltage of the left-eye image data $RGB_{L(LG)}$ modulated to have the low gamma characteristics to the data lines of the display panel 15 during the (n+1)th frame period Fn+1 to address the left-eye image data $RGB_{L(LG)}$ to the pixels of the display panel 15. The left-eye image data $RGB_{L(LG)}$ which has been modulated to have the low gamma characteristics has a low display luminance at low and medium gray levels compared with the normal gamma characteristics as shown in FIG. 11A. In response to the backlight control signal $C_{BL}$ of the high logic level, the backlight driving circuit 13 turns on the light source of the backlight unit 16 during the (n+1)th frame period Fn+1. The liquid crystal shutter control signal reception unit 17 opens the left-eye shutter $ST_L$ and shuts the right-eye shutter $ST_R$ in response to the liquid crystal shutter control signal $C_{ST}$ of the high logic level during the (n+1)th frame period Fn+1.

If a current time is determined to be an end point of the (n+1)th frame period Fn+1 according to the result of counting the frame period and lines, the controller 11 reverses the backlight control signal $C_{BL}$ to have a low logic level, and then reverses the liquid crystal shutter control signal $C_{ST}$ to have a low logic level within a blanking period following the end point of the (n+1)th frame period Fn+1 (S109 and S110). The backlight driving circuit 13 turns off the light source of the backlight unit 16 in response to the backlight control signal $C_{BL}$ of the low logic level at the end point of the (n+1)th frame period. The liquid crystal shutter control signal reception unit 17 shuts the left-eye shutter $ST_L$ and opens the right-eye shutter $ST_R$ within the blanking period following the end point of the (n+1)th frame period Fn+1 in response to the liquid crystal shutter control signal $C_{ST}$ of the low logic level.

If a current frame period is determined to be the (n+2)th frame period Fn+2 according to the result of counting the frame period, the controller 11 generates a display panel control signal $C_{DIS}$ from a start point of the (n+2)th frame period Fn+2, supplies first right-eye image data $RGB_R$ to the data driving circuit, and generates a liquid crystal shutter control signal $C_{ST}$ with a low logic level. The data driving circuit supplies a data voltage of the right-eye image data $RGB_R$ to the data lines of the display panel 15 during the (n+2)th frame period Fn+2 to address the right-eye image data $RGB_R$ to the pixels of the display panel 15. The liquid crystal shutter control signal receiving unit 17 shuts the left-eye shutter $ST_L$ and opens the right-eye shutter $ST_R$ in response to the liquid crystal shutter control signal $C_{ST}$ of the low logic level during the (n+2)th frame period Fn+2. Also, the controller 11 generates a backlight control signal $C_{BL}$ from a start point of the (n+2)th frame period Fn+2, determines a lapse time according to a line count value, and reverses the backlight control signal $C_{BL}$ to have a high logic level at a time point when a predetermined time T has elapsed from the start point of the (n+2)th frame period Fn+2 (S91 to S94). The predetermined time T may be determined within a time period larger than 0 but shorter than one frame period, and may be determined to be a certain time following a response time of the liquid crystal through experimentation. In response to the backlight control signal $C_{BL}$ of the high logic level, the backlight driving circuit 13 turns on the light source of the backlight unit 16 at a time point when the predetermined time T has elapsed after the start point of the (n+2)th frame period Fn+2.

Figure 11C:
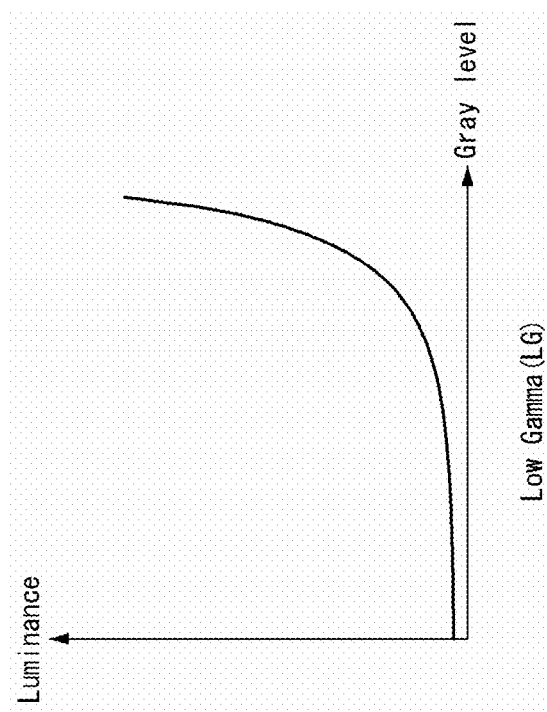

If a current frame period is determined to be the (n+3)th frame period Fn+3 according to the result of counting the frame period, the controller 11 generates a display panel control signal $C_{DIS}$, supplies right-eye image data $RGB_{R(LG)}$ which has been modulated to have low gamma characteristics as shown in FIG. 11C to the data driving circuit, and maintains the liquid crystal shutter control signal $C_{ST}$ at the low logic level (S115 and S116). The data driving circuit supplies a data voltage of the right-eye image data $RGB_{R(LG)}$ which has been modulated to have low gamma characteristics to the data lines of the display panel 15 during the (n+3)th frame period Fn+3 to address the right-eye image data $RGB_{R(LG)}$ to the pixels of the display panel 15. In response to the backlight control signal $C_{BL}$ of the high logic level, the backlight driving circuit 13 turns on the light source of the backlight unit 16 during the (n+3)th frame period Fn+3. The liquid crystal shutter control signal reception unit 17 shuts the left-eye shutter $ST_L$ and opens the right-eye shutter $ST_R$ in response to the liquid crystal shutter control signal $C_{ST}$ of the low logic level during the (n+3)th frame period Fn+3.

If a current time is determined to be an end point of the (n+3)th frame period Fn+3 according to the result of counting the frame period and lines, the controller 11 reverses the backlight control signal $C_{BL}$ to have a low logic level, and then reverses the liquid crystal shutter control signal $C_{ST}$ to have a high logic level within a blanking period following the (n+3)th frame period Fn+3 (S117 and S118). The backlight driving circuit 13 turns off the light source of the backlight unit 16 in response to the backlight control signal $C_{BL}$ of the low logic level at the end point of the (n+3)th frame period Fn+3. The liquid crystal shutter control signal reception unit 17 opens the left-eye shutter $ST_L$ and shuts the right-eye shutter $ST_R$ within the blanking period following the end point of the (n+3)th frame period Fn+3 in response to the liquid crystal shutter control signal $C_{ST}$ of the high logic level.

Meanwhile, In the exemplary embodiment of FIGS. 9 and 10, as a method of modulating gamma characteristics of odd-numbered frame data and even-numbered frame data, the methods disclosed in Korean Patent Application No. 10-2006-0108849 (Filed on Nov. 6, 2006), Korean Patent Application No. 10-2006-0078873 (Filed on Aug. 21, 2006), Korean Patent Application No. 10-2007-0038438 (Filed on Apr. 19, 2007), and Korean Patent Application No. 10-2006-0139203 (Filed on Dec. 30, 2006), which were filed by the applicant of the present invention, may be used.

In the above-described exemplary embodiments, the liquid crystal (LCD) display is mainly described as a display device, but without being limited thereto, the display device according to exemplary embodiments of the present invention may also be implemented as a flat panel display device such as a field emission display (FED), a plasma display panel (PDP), an electroluminescence device (EL) including an inorganic field emission display, an organic light emitting diode (OLED), and the like, as well as the LCD.

As described above, when left-eye image data and right-eye image data are time-division displayed on the display device and a stereoscopic image is implemented by time-dividing the liquid crystal shutter glasses, the backlight unit is controlled to be turned on and off, to thereby solve a crosstalk problem of the left-eye image an the right-eye image. In addition, flickering that appears in using a stereoscopic image display method in which a blanking period is extended and a shutter opening period is reduced can be resolved, and power consumption can be reduced. Therefore, a display quality can be enhanced regardless of any types of display devices in the glass type stereoscopic image display.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A stereoscopic image display comprising:
  a display device that time-division displays left-eye image data and right-eye image data;
  shutter glasses comprising a left-eye shutter and a right-eye shutter alternately turned on and off in synchronization with the display device; and
  a backlight unit that irradiates light to the display device and is periodically turned on and off,
  wherein the display device repeatedly addresses the left-eye image data twice during an nth frame period and an (n+1)th frame period, and repeatedly addresses the right-eye image data twice during an (n+2)th frame period and an (n+3)th frame period, and the backlight unit is turned on when a certain time lapses after a start point of the (n+1)th frame period and turned off at an end point of the (n+1)th frame period, and is turned on when a certain time lapses after a start point of the (n+3)th frame period and turned off at an end point of the (n+3)th frame period.

2. The display of claim 1, wherein the stereoscopic image display further comprising:
  a controller that controls an operation timing of the display device, the shutter glasses, and the backlight unit and supplies the left-eye image data and the right-eye image data to a data driver of the display device.

3. The display of claim 2, wherein the controller controls the operation timing of the display device, the shutter glasses and the backlight unit based on a frame frequency of 200 Hz or higher.

4. The display of claim 1, wherein the left-eye shutter of the shutter glasses is open during the nth frame period and the (n+1)th frame period, and the right-eye shutter of the shutter glasses is open during the (n+2)th frame period and the (n+3)th frame period.

5. A method of driving a stereoscopic image display comprising:
  time-division displaying left-eye image data and right-eye image data on a display device;
  alternately turning on and off a left-eye shutter and a right-eye shutter of shutter glasses in synchronization with the display device;
  turning on and off a backlight unit that irradiates light to the display device such that the backlight unit is turned on when a predetermined time determined according to a response time of liquid crystal lapses from a start point of a frame period; and
  repeatedly addressing the left-eye image data twice during an nth frame period and an (n+1)th frame period, and repeatedly addressing the right-eye image data twice during an (n+2)th frame period and an (n+3)th frame period to the display device;
  wherein the backlight unit is turned on when a certain time lapses after a start point of the (n+1)th frame period and the backlight unit is turned off at an end point of the (n+1)th frame period, and the backlight unit is turned on when a certain time lapses after a start point of the (n+3)th frame period and then the backlight unit is turned off at an end point of the (n+3)th frame period.

6. The method of claim 5, wherein the display device, the shutter glasses, and the backlight unit are operated at a frame frequency of 200 Hz or higher.

7. A stereoscopic image display comprising:
  a display device that time-division displays left-eye image data and right-eye image data;
  shutter glasses comprising a left-eye shutter and a right-eye shutter alternately turned on and off in synchronization with the display device; and
  a backlight unit that irradiates light to the display device and is periodically turned on and off,
  wherein the backlight unit is turned on when a certain time lapses after a start point of an nth frame period and turned off at an end point of an (n+1)th frame period, and is turned on when a certain time lapses after a start point of an (n+2)th frame period and turned off at an end point of an (n+3)th frame period.

8. The display of claim 7, wherein the display device addresses the left-eye data during the nth frame period, addresses black data during the (n+1)th frame period, addresses the right-eye image data during the (n+2)th frame period, and then addresses the black data during the (n+3)th frame period.

9. The display of claim 8, wherein the left-eye shutter of the shutter glasses is open during the nth frame period and the (n+1)th frame period, and the right-eye shutter of the shutter glasses is open during the (n+2)th frame period and the (n+3)th frame period.

10. The display of claim 7, wherein the display device addresses left-eye data having first gamma characteristics during the nth frame period, addresses left-eye image data having second gamma characteristics during the (n+1)th frame period, addresses right-eye image data having first gamma characteristics during the (n+2)th frame period, and then addresses right-eye image data having second gamma characteristics during the (n+3)th frame period.

11. The display of claim 10, wherein the left-eye shutter of the shutter glasses is open during the nth frame period and the (n+1)th frame period, and the right-eye shutter of the shutter glasses is open during the (n+2)th frame period and the (n+3)th frame period.

12. A method of driving a stereoscopic image display comprising:

time-division displaying left-eye image data and right-eye image data on a display device;

alternately turning on and off a left-eye shutter and a right-eye shutter of shutter glasses in synchronization with the display device; and turning on and off a backlight unit that irradiates light to the display device such that the backlight unit is turned on when a predetermined time determined according to a response time of liquid crystal lapses from a start point of a frame period, wherein the backlight unit is turned on when a certain time lapses after a start point of an nth frame period and turned off at an end point of an (n+1)th frame period, and is turned on when a certain time lapses after a start point of an (n+2)th frame period and turned off at an end point of an (n+3)th frame period.

13. The method of claim 12, further comprising:
addressing the left-eye data during the nth frame period, addressing black data during the (n+1)th frame period, addressing the right-eye image data during the (n+2)th frame period, and then addressing the black data during the (n+3)th frame period to the display device.

14. The method of claim 13, wherein the display device, the shutter glasses, and the backlight unit are operated at a frame frequency of 200 Hz or higher.

15. The method of claim 12, further comprising:
addressing left-eye data having first gamma characteristics during the nth frame period, addressing left-eye image data having second gamma characteristics during the (n+1)th frame period, addressing right-eye image data having first gamma characteristics during the (n+2)th frame period, and then addressing right-eye image data having second gamma characteristics during the (n+3)th frame period.

16. The method of claim 15, wherein the display device, the shutter glasses, and the backlight unit are operated at a frame frequency of 200 Hz or higher.

* * * * *